US006620477B2

(12) United States Patent
Nagai

(10) Patent No.: US 6,620,477 B2
(45) Date of Patent: Sep. 16, 2003

(54) LAMINATED GLASS AND AUTOMOBILE EMPLOYING IT

(75) Inventor: Kuniko Nagai, Aiko-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 98 days.

(21) Appl. No.: 09/963,645

(22) Filed: Sep. 27, 2001

(65) Prior Publication Data

US 2002/0039649 A1 Apr. 4, 2002

(30) Foreign Application Priority Data

Sep. 29, 2000 (JP) ........................................ 2000-298655

(51) Int. Cl.⁷ ........................... B32B 3/10; B32B 17/10; C03C 27/12
(52) U.S. Cl. ........................... 428/46; 428/49; 428/201; 428/203; 428/204; 428/205; 428/206; 428/207; 428/436; 428/437
(58) Field of Search ........................... 428/46, 49, 201, 428/203, 204, 205, 206, 207, 328, 436, 437

(56) References Cited

U.S. PATENT DOCUMENTS

| 3,354,025 A | | 11/1967 | Aykanian et al. |
| 3,405,425 A | | 10/1968 | Buckley et al. |
| 5,162,145 A | * | 11/1992 | Schaefer ...................... 428/209 |
| 6,506,487 B2 | * | 1/2003 | Nagai .......................... 428/329 |

FOREIGN PATENT DOCUMENTS

| GB | 1002024 | 8/1965 |
| JP | 8-259279 | 10/1996 |
| JP | 2715859 | 11/1997 |
| JP | 11-352314 | 12/1999 |

* cited by examiner

Primary Examiner—D. S. Nakarani
(74) Attorney, Agent, or Firm—Oblon, Spivak, McClelland, Maier & Neustadt, P.C.

(57) ABSTRACT

A laminated glass comprising a plurality of glass sheets laminated one on another with an interliner provided between the respective adjacent glass sheets, wherein said laminated glass has at least a first region and a second region, as viewed from the front, and at the second region, said laminated glass has an infrared transmittance higher than the infrared transmittance at the first region.

20 Claims, 3 Drawing Sheets

LAMINATED GLASS AND AUTOMOBILE EMPLOYING IT

The present invention relates to a laminated glass and an automobile employing it.

In recent years, it has become common to use an infrared shielding window glass as a window glass for an automobile for the purpose of suppressing a temperature increase in the automobile and reducing the cooling load. As a conventional infrared shielding window glass, a thin film-attached glass plate is used which is prepared by laminating a thin film of various metal or metal oxide on the surface of a glass plate, whereby by the function of such a film, a solar radiation energy entering into the car can be substantially reduced.

However, the above thin film has electrical conductivity, and it tends to reduce radiowave transmittance of a window glass and thus is likely to bring about a trouble in the function of an antenna for a radio, TV or GPS (Global Positioning System) provided on the window glass. Such an antenna is prepared by a circuit pattern (such as a sintered body of a conductive ceramic paste) printed on the inside of e.g. a rear window glass. Therefore, in order for the printed pattern to maintain the function as an antenna, the window glass is required to have a high radiowave transmittance.

To solve such a problem, JP-A-8-259279 proposes a laminated glass for shielding infrared rays while securing the radiowave transmittance. This laminated glass has an interliner having functional fine particles having a particle size of at most 0.2 μm incorporated and dispersed therein and is said to be able to shield infrared rays and to reduce radiowave reception difficulty.

For example, JP-A-8-259279 discloses, as Example 6, a laminated glass prepared by sandwiching between glass sheets an interliner prepared by adding 7 g of DIDP (diisodecyl phthalate) having 20 wt % of ITO ultrafine particles (particle size: at most 0.1 μm) incorporated and dispersed therein and 95 g of usual DIDP, to 323 g of a PVB resin. Namely, a laminated glass is disclosed wherein a clear glass sheet having a thickness of 2 mm and a green glass sheet having a thickness of 2 mm are bonded by an interliner having ITO ultrafine particles incorporated and dispersed therein (corresponding to an interliner having about 0.3 ($\approx 0.2 \times 7 \div (7+95+323) \times 100$) part by mass of ITO ultrafine particles incorporated to 100 parts by mass as the total mass of the interliner). This laminated glass has a sufficient solar radiation transmittance and at the same time has realized a low haze, such that its solar radiation transmittance Ts is 42.0%, and the haze H is at a level of 0.2%.

However, in this Example 6, the content of ITO ultrafine particles is small, whereby transmittance of near infrared rays can not be adequately suppressed, thus leading to an increase of the surface temperature of a car interior seat or a steering wheel and an increase of the interior temperature. Further, if the proportion of ITO ultrafine particles is increased to increase the shielding performance against lights with wavelengths within the near infrared ray region, troubles in various systems employing infrared data communication, are likely to occur.

For example, in recent years, VICS (Vehicle Information and Communication System) employing an optical beacon has been widely used in Japan. This is a system to prevent traffic jam, etc., by communicating traffic information collected by an information center to each automobile and at the same time communicating information on the automobile side to the information center. Specifically, infrared data communication is carried out in both directions between a device installed at the road side (hereinafter referred to as a road side antenna) and a device installed in an automobile (hereinafter referred to as an in-vehicle device).

Further, a keyless entry is a system to carry out opening and closing a door lock by sending an infrared signal to a light receptor in an automobile by using a light emitter which the owner of the automobile has. Thus, in order to let such a system operate normally, the window glass is required to have an infrared transmittance. Particularly for such a system, an infrared light having a wavelength of about 850 nm is employed.

Accordingly, a window glass for an automobile is required to have a nature to let an infrared light having a wavelength of about 850 nm permeate sufficiently. However, addition of ITO powder for heat shielding serves not only to shield an infrared light having a wavelength in the vicinity of from 1,000 nm to 2,000 nm but also to shield an infrared light having a wavelength of about 850 nm, whereby there has been a problem that the infrared data communication tends to be difficult.

It is an object of the present invention to solve such a problem of the prior art and to provide a laminated glass which shields an infrared light having a wavelength of at least 1,000 nm which causes an increase of the interior temperature, and which permits permeation of an infrared light having a wavelength of about 850 nm useful for infrared data communication, and to provide an automobile employing such a laminated glass.

To accomplish this object, the present invention provides a laminated glass comprising a plurality of glass sheets laminated one on another with an interliner provided between the respective adjacent glass sheets, characterized in that said laminated glass has at least a first region and a second region, as viewed from the front, and at the second region, said laminated glass has an infrared transmittance higher than the infrared transmittance at the first region.

In a preferred embodiment, the visible light transmittance of said laminated glass at the second region is lower than the visible light transmittance of said laminated glass at the first region.

Still further, the present invention provides an automobile provided with said laminated glass and an in-vehicle device for infrared data communication with an external device via the second region.

Now, preferred embodiments of the present invention will be described in detail with reference to the drawings.

Figure 1:
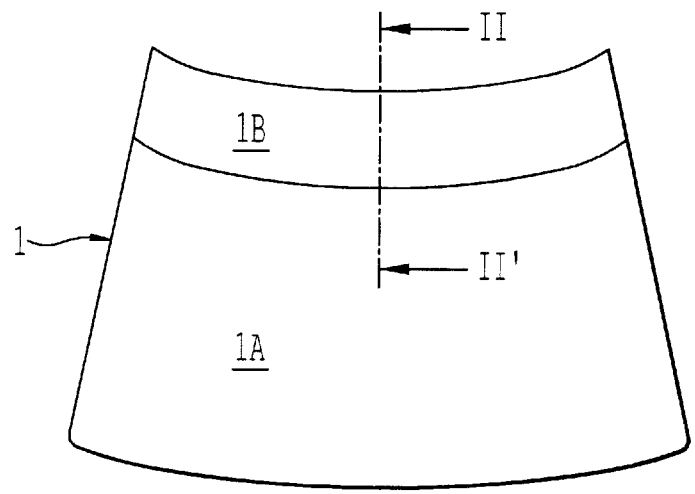
FIG. 1 is a front view illustrating an embodiment of the laminated glass of the present invention.

FIG. 1 shows an embodiment of the laminated glass of the present invention. As shown in FIG. 1, the laminated glass 1 has two regions, as viewed from the front (the first region 1A and the second region 1B which are different in the infrared transmittance). The shape and position of the second region 1B may be suitably set, and another region having an infrared transmittance different from the first and second regions, may further be provided.

Figure 2:
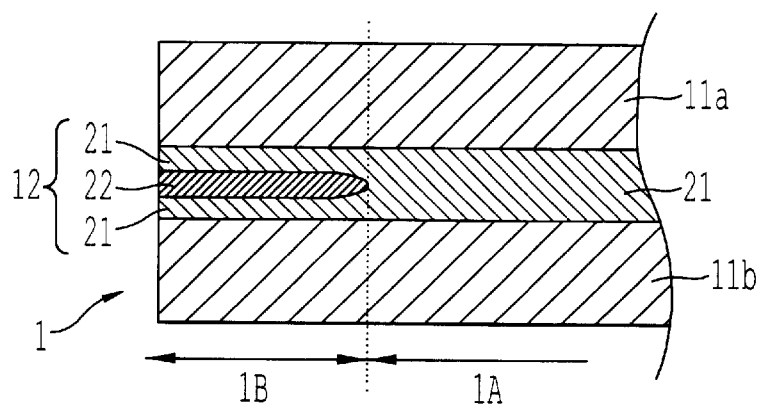
FIG. 2 is a schematic cross-sectional view along line II–II' of the laminated glass in FIG. 1.

FIG. 2 shows a schematic cross-sectional view along line II–II' in FIG. 1. The laminated glass 1 is prepared by pressing two glass sheets 11a and 11b sandwiching an interliner 12, in an autoclave and press-bonding them to be integral. The interliner 12 is made of e.g. an organic resin film of a polyvinyl butyral type or an ethylene/vinyl acetate copolymer type. Further, the interliner 12 is prepared so that the infrared transmittance is mutually different as between the first region 1A and the second region 1B.

At the first region 1A, the interliner 12 consists of a single layer (a shielding layer 21), and at the second region 1B, the interliner 12 has a three layered structure having another organic resin layer (a non-shielding layer 22) inserted in the shielding layer 21 extending from the first region 1A. At the first region 1A, the interliner 12 consists of a shielding layer 21 having infrared shielding fine particles with a particle size of at most 0.2 μm (preferably from 0.001 to 0.15 μm) incorporated and dispersed in the above-mentioned organic resin film. At the second region 1B, the interliner 12 has a construction such that a non-shielding layer 22 containing substantially no infrared shielding fine particles is sandwiched between two shielding layers 21. Accordingly, at the second region 1B, the content of infrared shielding fine particles is smaller than at the first region 1A, whereby the infrared transmittance at the first region 1A is smaller than the infrared transmittance at the second region 1B. At the second region 1B, the thicknesses of the respective layers may be equal or different.

Shielding Layer 21

The shielding layer 21 is one having infrared shielding fine particles having a particle size of at most 0.2 μm (preferably from 0.15 to 0.001 μm) incorporated and dispersed in the above-mentioned material for the interliner 12. The material for the infrared shielding fine particles may, for example, be fine particles made of a metal, an oxide, a nitride or a sulfide of Sn, Ti, Si, Zn, Zr, Fe, Al, Cr, Co, Ce, In, Ni, Ag, Cu, Pt, Mn, Ta, W, V or Mo, or a doped product having Sb or F doped thereto. These fine particles may be used alone or as a composite. It is particularly effective to employ a mixture having a single product or a composite of such fine particles mixed with an organic resin, or a coated product having a single product or a composite of such fine particles coated with an organic resin, to obtain various properties required for a window glass for an automobile.

Further, it is preferred to employ at least one of antimony-doped tin oxide (ATO) fine particles and tin-doped indium oxide (ITO) fine particles. Both ATO fine particles and ITO fine particles are excellent in infrared shielding properties, and their amount to be incorporated to the interliner may be small. When ATO fine particles and ITO fine particles are compared, ITO fine particles are superior in the infrared shielding properties, and it is particularly preferred to employ ITO fine particles as the infrared shielding fine particles.

Further, it is preferred that in the shielding layer 21, the infrared shielding fine particles are incorporated and blended in a blending ratio of from 0.1 to 1 part by mass, more preferably from 0.1 to 0.5 part by mass, per 100 parts by mass of the total mass of the shielding layer 21 of the interliner 12. When the blending ratio is at least 0.1 part by mass, the desired infrared shielding properties can be obtained, and when the blending ratio is preferably at most 1 part by mass, more preferably at most 0.5 part by mass, the haze of the laminated glass can be controlled at a low level, and the appearance of the laminated glass can be made good.

In the foregoing, reference is made to a case wherein infrared shielding fine particles are incorporated to the interliner 12 to form a shielding layer 21. However, it is possible to employ one having an infrared shielding film formed on an organic resin film. For example, one having a heat ray reflecting film disclosed in JP-A-11-352314 sandwiched between two polyvinyl butyral films, may be used as an interliner 12. Further, instead of imparting infrared shielding properties to an interliner, a laminated glass having an infrared shielding film formed on the surface of a glass sheet (especially on the side which is in contact with the interliner), may be used.

Non-shielding Layer 22

On the other hand, the non-shielding layer 22 consists essentially of the above-described material for the interliner 12 and contains no or substantially no infrared shielding fine particles. This non-shielding layer 22 may be colorless transparent or may be colored with a dye (such as an azo dye or an anthraquinone dye) or a colorant such as a pigment (an organic type or an inorganic type). When the non-shielding layer 22 is colored, the second region 1B can be used as a shade band for a front glass of an automobile. A shade band is a colored region of a strip form provided along the upper side of the front glass and is designed to reduce solar radiation of a visible light region entering into the car so that the driver will be protected from glare of solar radiation, etc.

Shade Band

Further, it is advisable that among the layers constituting the second region, at least one layer (the non-shielding layer 22 in FIG. 2) other than the shielding layer, is colored, and this colored region is employed as a shade band. The infrared shielding properties at the second region 1B are poor as compared with the infrared shielding properties at the first region 1A. However, by coloring the second region 1B, the visible light transmittance can be controlled to be low. As a result, the solar radiation transmittance of the laminated glass 1 as a whole can be made low. The visible light transmittance obtained in accordance with JIS R3106 of the second region 1B is preferably lower by at least 5%, particularly preferably at least 10%, than the visible light transmittance of the first region 1A.

The non-shielding layer 22 is not required to be totally free from infrared shielding fine particles, and it may be adjusted so that the content of infrared shielding fine particles is smaller than in the shielding layer 21. Accordingly, the non-shielding layer 22 may be in any one of the states (1) where no infrared shielding fine particles are incorporated, (2) where infrared ray shielding fine particles are incorporated in an amount of not more than 1/10 of the blending ratio of the infrared shielding fine particles in the shielding layer 21 (the ratio of the mass of infrared shielding fine particles to the mass of the entire interliner), and (3) where infrared ray shielding fine particles having shielding properties inferior to the infrared shielding fine particles contained in the shielding layer 21, are incorporated. Further, in a case where the non-shielding layer 22 has a multi-layered structure, at least one layer thereof may satisfy any one of the above states (1) to (3). However, the condition of (2) may not be satisfied if the infrared transmittance (wavelength region of from 800 to 2,000 nm) of the laminated glass 1 at the second region 1B, is higher by at least 1% than the infrared transmittance at the first region 1A.

Laminated Glass 1

Further, the laminated glass 1 may be a laminate comprising three or more glass sheets and interliners interposed between these glass sheets. In such a case, the number of interliners becomes plural, and at least one interliner is required to be an interliner having the above-mentioned first and second regions. Further, the thickness of each of glass sheets to be used for an window glass of an automobile is preferably from 1.2 to 5 mm. In such a case, the thicknesses of the respective glass sheets may be the same or different from one another. If the thicknesses of the respective glass sheets are the same, the thickness of each sheet is preferably from 1.4 to 5 mm, more preferably from 1.7 to 3 mm. If the thicknesses of the respective glass sheets are different, the thickness of a thin glass sheet is preferably from 1.0 to 5 mm, and the thickness of a thick glass sheet is preferably from 1.4 to 5 mm. More preferably, the thickness of a thin glass sheet is from 1.2 to 2.5 mm, and the thickness of a thick glass sheet is from 2 to 3 mm.

Figure 3:
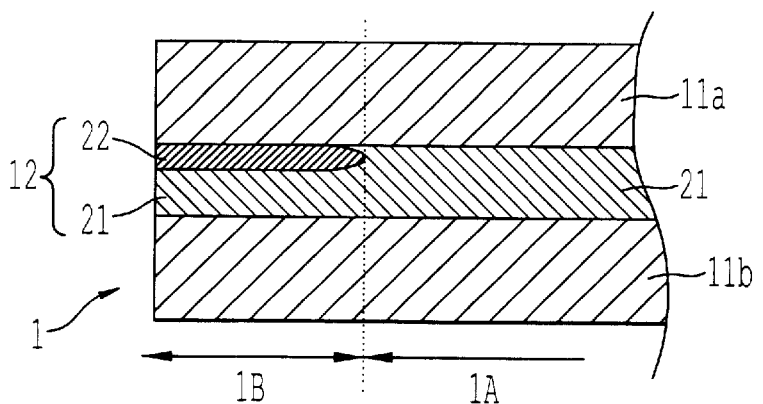
FIG. 3 is a schematic cross-sectional view along line II–II' showing another embodiment of the laminated glass in FIG. 1.

FIG. 3 is a cross-sectional view illustrating another embodiment of the interliner. As shown in FIG. 3, at the second region 1B, the interliner 12 consists of two layers i.e. a shielding layer 21 and a non-shielding layer 22. This interliner 12 comprises a first region which consists of one layer (a shielding layer 21) and a second region which has a layered structure of double layers (shielding layer 21/non-shielding layer 22) i.e. one layer more than the layer structure of the first region. Further, a still another layer may be added on the surface or in the interior of the interliner 12.

Method for Producing the Interliner

Now, an embodiment of the method for producing the interliner will be described. Firstly, infrared shielding fine particles having a particle size of at most 0.2 µm will be dispersed in a plasticizer, and this plasticizer is added and dispersed in a resin solution for an interliner, followed by mixing and kneading to obtain a resin material containing the infrared shielding fine particles. Then, this resin material and a resin material for an interliner containing substantially no infrared shielding fine particles, are molded into a film by e.g. extrusion molding to obtain an interliner as shown in FIG. 2 or 3. At that time, the respective resin materials may simultaneously be extrusion-molded, or films extrusion-molded separately, may be bonded, to obtain the interliner.

To simplify the production process, it is preferred to simultaneously extrusion molding the respective resin materials. Further, the interliner 12 at the first region 1A may be prepared by a single organic resin film, or may be prepared by laminating a plurality of films made of the same material. Further, at the time of adding and dispersing the plasticizer, various additives may be added to the resin solution for an interliner. As such additives, various pigments, organic ultraviolet absorbers and organic infrared absorbers may, for example, be mentioned. As the plasticizer and the solvent for the resin solution for an interliner, known materials may be employed.

Further, from the viewpoint that the respective resin materials are preferably simultaneously extrusion-molded as mentioned above, and control of the starting material at the time of the production is easy, it is preferred that no infrared shielding fine particles are incorporated in the non-shielding layer 22.

Automobile

Figure 4:
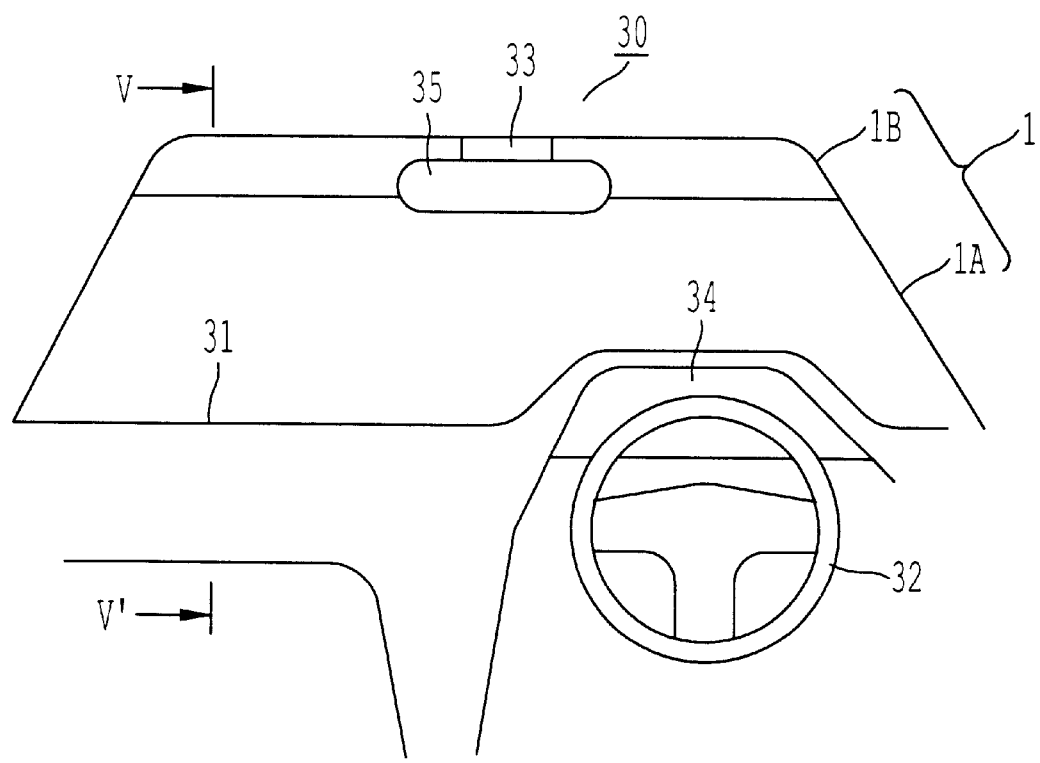
FIG. 4 is a view illustrating an embodiment of an automobile.
Figure 5:
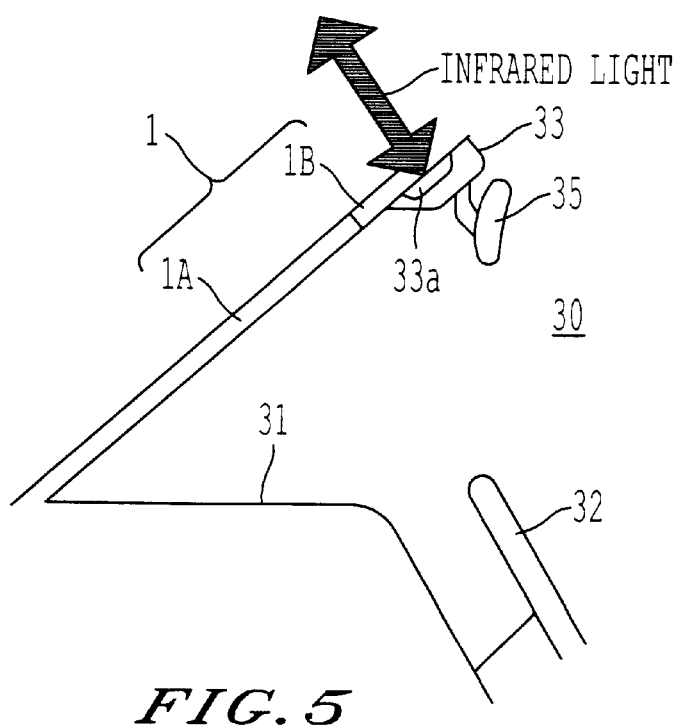
FIG. 5 is a schematic cross-sectional view along line V–V' in FIG. 4.

FIG. 4 shows a view as looking forward from a driver's seat (not shown) of an automobile employing the laminated glass as shown in FIG. 1. The laminated glass 1 as a front glass, has the above-mentioned first region 1A and second region 1B which respectively have different infrared transmittances. Between the second region 1B and a room mirror 35, an in-vehicle device 33 having an infrared data communication function is installed. On a dashboard 31 located this side of the laminated glass 1, meters 34 are installed at a position facing the driver's seat. Between the meters 34 and the driver's seat, a steering wheel 32 is installed. Further, as shown in FIG. 5, a light receiving section 33a and the second region 1B are arranged to face each other, and the in-vehicle device 33 is designed to be capable of infrared data communication with a roadside antenna installed outside the vehicle, via the second region 1B. Further, the in-vehicle device 33 may be installed on the dashboard 31 or at any other position, so long as the light receiving section 33a is positioned to face a roadside antenna (not shown) via the second region 1B.

Here, a preferred embodiment for an automobile 30 to perform infrared data communication, will be described. This automobile 30 is characterized by shielding an infrared light having a wavelength of 1,000 nm and longer wavelength which increases the inside temperature, by the first region 1A and permitting an infrared light having a wavelength of about 850 nm useful for infrared data communication to permeate. In order to obtain such effects, with respect to some or all wavelength lights in a wavelength range of from 800 to 2,000 nm, it is preferred to set the infrared transmittance at the second region 1B to be higher by at least 1% than the infrared transmittance at the first region 1A.

Further, the proportion of the area of the second region to the entire interliner 2 is preferably from 1 to 50%. In a case where the thickness of the interliner 12 is substantially equal in the respective regions, the total thickness of the shielding layer at the second region 1B becomes thinner than the thickness of the shielding layer at the first region 1A. Accordingly, if the area of the second region 1B is too large, it tends to be difficult to obtain a sufficient infrared shielding performance as a glass for an automobile. Therefore, the proportion of the area of the second region 1B in the entire interliner 12 is made to be from 1 to 50%, whereby it is possible to shield an infrared light of 1,000 nm and longer wavelength over a wide area of the laminated glass 1. Further, the light receiving section 33A and the second region 1B are arranged to face each other, whereby infrared data communication will be possible.

As described in the foregoing, the laminated glass of this embodiment uses an interliner having infrared shielding fine particles incorporated and dispersed therein, whereby an infrared shielding function can be imparted. Accordingly, the sheet resistance of the laminated glass can be made large, and the laminated glass according to this embodiment has a radiowave transmittance to permit a proper function of various systems or an antenna function for e.g. a radio, TV or GPS. Further, the sheet resistance of the glass sheet of at least the second region 1B according to this embodiment is preferably, for example, at least 20 k$\Omega$/□, particularly preferably at least 10 M$\Omega$/□.

Now, the present invention will be described in further detail with reference to Examples. However, it should be understood that the present invention is by no means restricted to such specific Examples.

10 g of 3GH (triethylene glycol bis(2-ethyl butyrate)) containing ITO fine particles (particle size: at most 0.02 µm) (the amount of ITO fine particles was 10% by mass %), 130 g of usual 3GH and 360 g of a PVB (polyvinyl butyral) resin were prepared respectively. Both 3GH were added to the PVB resin, and in a state heated to about 70° C., kneading was carried out by a three roll mixer for about 15 minutes to mix them, whereby a resin material was obtained. Then, this resin material was formed into a film having a thickness of about 0.3 mm by an extruder while maintaining the temperature at a level of about 190° C. and wound up on a roll, to obtain a film (a).

On the other hand, a film (b) made of a PVB resin containing no ITO fine particles (having an azo dye added) and having a thickness of 0.3 mm, was prepared. The films (a) and (b) were, respectively, cut into 15 cm×30 cm and arranged so that the long sides of the rectangular shapes were in contact with each other. The arranged films (a) and (b) were sandwiched between two films (a) of 30 cm×30 cm. As a result, an interliner 12 having a thickness of 0.9 mm was obtained wherein the region consisting of the film (a)/the film (b)/the film (a) corresponds to the above-mentioned second region 1B, and the region consisting of the film (a)/the film (a)/the film (a) corresponds to the above-mentioned first region 1A. Thus, the first region 1A has a single layer structure by the film (a) having a thickness of 0.9 mm, having three films (a) bonded to one another. The second region has a three layered structure having the film (b) interposed between two films (a).

Then, this interliner was sandwiched between two sheets of green colored float glass having a square of 30 cm×30 cm and a thickness of 2.0 mm. This sandwich structure was put into an aluminum pack, and an absolute pressure of 10 kPa was exerted to this pack to deaerate the interior of the pack for 10 minutes. Then, the deaerated pack was transferred to an oven of 120° C., and vacuum pressing was carried out by maintaining this temperature for 30 minutes. Then, the sandwich structure tentatively press-bonded by the vacuum pressing was put into an autoclave and subjected to thermo-compression bonding under a pressure of 1.3 MPa at a temperature of 135° C., to obtain a transparent laminated glass.

With respect to the laminated glass thus prepared, the transmittance at a wavelength within a range of from 300 to 2,100 nm was measured by a spectrophotometer (U4000, manufactured by Hitachi, Ltd.), and in accordance with JIS R3106, the visible light transmittance Tv and the solar radiation transmittance Te were obtained. As a result, at the second region of the laminated glass, the visible light transmittance Tv was 36%, and the solar radiation transmittance Te was 50%, and at the first region of the laminated glass, the visible light transmittance Tv was 74%, and the solar radiation transmittance Te was 46%.

Figure 6:
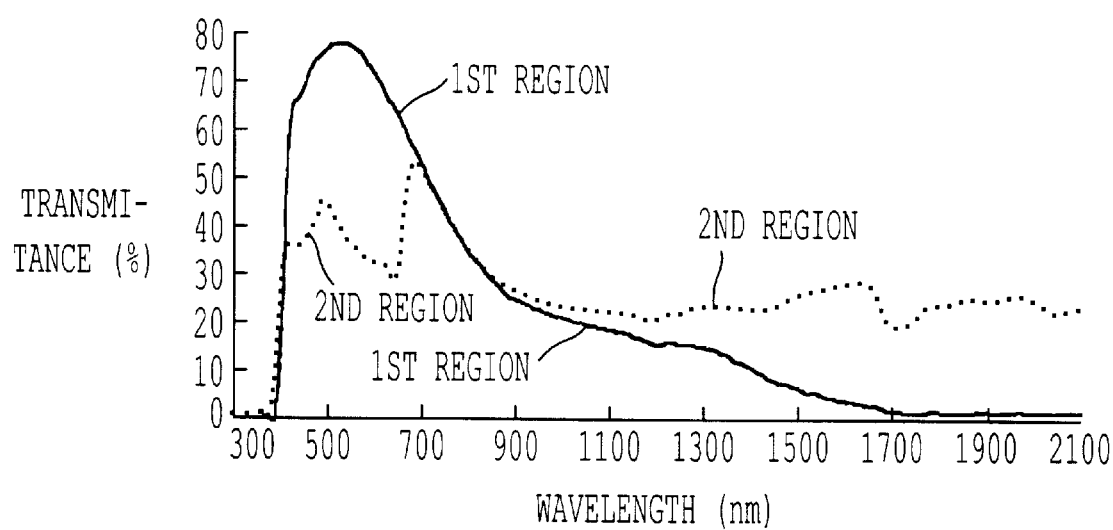
FIG. 6 is a graph showing an embodiment of the spectral transmittance of a laminated glass.

FIG. 6 is a graph showing spectral transmittances of the first and second regions of the laminated glass prepared by the above production method. As is evident from the Figure, the transmittance of an infrared ray having a wavelength of 900 nm of the laminated glass was about 26% at the second region and about 24% at the first region. When communication by an optical beacon was carried out by using an infrared light having a wavelength of 900 nm, if the front glass of an automobile is a laminated glass constituted solely by the first region 1A, the infrared light entering into the car will be about 5.8 (≈0.24×0.24×100)% of the infrared light initially irradiated from a roadside antenna. Whereas, in the case of the laminated glass 1 shown in Table 1, having the first region 1A and the second region 1B, the infrared light entering into the car will be about 6.8 (≈0.26×0.26×100)% of the initial infrared light.

As is evident from the foregoing description, the laminated glass of the present invention is capable of shielding an infrared light having a wavelength of at least 1,000 nm which increases the internal temperature of the car, by the first region and, at the same time, capable of permitting an infrared light of about 850 nm useful for infrared data communication to pass via the second region. Further, the automobile of the present invention is excellent in the heat shielding performance and capable of utilizing various services using infrared data communication, by employing the above laminated glass.

The entire disclosure of Japanese Patent Application No. 2000-298655 filed on Sep. 29, 2000 including specification, claims, drawings and summary are incorporated herein by reference in its entirety.

What is claimed is:

1. A laminated glass comprising a plurality of glass sheets laminated one on another with an interliner provided between the respective adjacent glass sheets, wherein said laminated glass has at least a first region and a second region, as viewed from the front, and at the second region, said laminated glass has an infrared transmittance higher than the infrared transmittance at the first region, wherein at the second region, said interliner has an infrared transmittance higher than the infrared transmittance at the first region.

2. The laminated glass according to claim 1, wherein the visible light transmittance of said laminated glass at the second region is lower than the visible light transmittance of said laminated glass at the first region.

3. The laminated glass according to claim 1, wherein the proportion of the area of the second region of the interliner to the entire area of the interliner is from 1 to 50%.

4. The laminated glass according to claim 1, wherein said laminated glass is a window glass for an automobile.

5. An automobile comprising the laminated glass according to claim 1, and an in-vehicle device for infrared data communication with an external device via the second region.

6. The laminated glass according to claims 1, wherein the second region is colored.

7. The laminated glass according to claim 1, wherein the second region comprises substantially no infrared shielding fine particles.

8. A laminated glass comprising a plurality of glass sheets laminated one on another with an interliner provided between the respective adjacent glass sheets, wherein said laminated glass has at least a first region and a second region, as viewed from the front, and at the second region, said laminated glass has an infrared transmittance higher than the infrared transmittance at the first region, wherein at the first region, said interliner comprises an interliner material comprising infrared shielding fine particles incorporated and dispersed therein.

9. The laminated glass according to claim 8, wherein the infrared shielding fine particles comprise at least one selected from the group consisting of tin-doped indium oxide and antimony-doped tin oxide.

10. The laminated glass according to claim 4, wherein the infrared shielding fine particles have a particle size of at most 0.2 µm.

11. The laminated glass according to claim 8, wherein the infrared shielding fine particles have a particle size of from 0.001 to 0.15 µm.

12. The laminated glass according to claim 8, wherein the transmittance of some or all of infrared radiation in the wavelength range of from 800 to 2,000 nm at the second region, are not higher by at least 1% than the transmittance in the first region.

13. The laminated glass according to claim 8, wherein at the second region, the interliner has a multi-layered structure, and at least one layer of the multi-layered structure is a layer comprising substantially no infrared shielding fine particles.

14. The laminated glass according to claim 13, wherein the layer comprising substantially no infrared shielding fine particles, is colored.

15. The laminated glass according to claim 8, wherein at the second region, the interliner comprises infrared shielding fine particles in an amount of not more than 1/10 of the proportion of infrared shielding fine particles of the interline at the first region.

16. The laminated glass according to claim 8, wherein at the second region, the interliner comprises infrared shielding fine particles having infrared shielding properties inferior to the infrared shielding properties of the infrared shielding fine particles in the first region.

17. The laminated glass according to claim 8, wherein the visible light transmittance of said laminated glass at the second region is lower than the visible light transmittance of said laminated glass at the first region.

18. The laminated glass according to claim 8, wherein the proportion of the area of the second region of the interliner to the entire area of the interliner is from 1 to 50%.

19. The laminated glass according to claim 8, wherein said laminated glass is a window glass for an automobile.

20. An automobile comprising the laminated glass according to claim 8, and an in-vehicle device for infrared data communication with an external device via the second region.

* * * * *